US009986442B2

(12) United States Patent
Redana et al.

(10) Patent No.: US 9,986,442 B2
(45) Date of Patent: May 29, 2018

(54) RELAY NODES

(75) Inventors: Simone Redana, München (DE); Oumer Teyeb, Solna (SE); Bernhard Raaf, Neuried (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days. days.

(21) Appl. No.: 13/878,313

(22) PCT Filed: Oct. 8, 2010

(86) PCT No.: PCT/EP2010/065113
§ 371 (c)(1),
(2), (4) Date: Apr. 30, 2013

(87) PCT Pub. No.: WO2012/045370
PCT Pub. Date: Apr. 12, 2012

(65) Prior Publication Data
US 2013/0215820 A1    Aug. 22, 2013

(51) Int. Cl.
*H04B 7/14*   (2006.01)
*H04W 16/26*  (2009.01)
(Continued)

(52) U.S. Cl.
CPC .......... *H04W 16/26* (2013.01); *H04W 48/08* (2013.01); *H04B 7/2606* (2013.01); *H04W 8/26* (2013.01);
(Continued)

(58) Field of Classification Search
CPC ..... H04W 16/26; H04W 48/16; H04W 76/02; H04W 84/047
(Continued)

(56) References Cited

U.S. PATENT DOCUMENTS

2010/0103865 A1*  4/2010  Ulupinar ........... H04L 29/12207
                                                    370/315
2010/0323684 A1*  12/2010  Cai ..................... H04B 7/2606
                                                    455/422.1
(Continued)

OTHER PUBLICATIONS

3GPP TR 36.806 V9.0.0. (Mar. 2010) Evolved Universal Terrestrial Radio Access (E-UTRA); Relay architectures for E-UTRA (LTE-Advanced) (Release 9).*
(Continued)

*Primary Examiner* — Faisal Choudhury
(74) *Attorney, Agent, or Firm* — Harrington & Smith

(57) ABSTRACT

A method, including receiving, at a donor access node from a relay node associated with the donor access node, an identification of one or more other access nodes detected at the relay node and sending configuration information about said relay node from said donor access node to at least one of said one or more other access nodes in advance of an indication that a user equipment associated with the relay node has detected said at least one other access node, without at the same time sending said configuration information to at least one further access node that is detected by one or more other relay nodes or user equipments associated with the donor access node but not detected by said relay node. Wherein said configuration information includes information for setting up a communication with the relay node other than via a core network associated with the donor access node.

13 Claims, 6 Drawing Sheets

(51) Int. Cl.
*H04W 48/08* (2009.01)
*H04B 7/26* (2006.01)
*H04W 8/26* (2009.01)
*H04W 28/06* (2009.01)
*H04W 48/16* (2009.01)
*H04W 76/02* (2009.01)
*H04W 84/04* (2009.01)

(52) U.S. Cl.
CPC ............ *H04W 28/06* (2013.01); *H04W 48/16* (2013.01); *H04W 76/02* (2013.01); *H04W 84/047* (2013.01)

(58) Field of Classification Search
USPC ........................................................ 370/315
See application file for complete search history.

(56) References Cited

U.S. PATENT DOCUMENTS

| | | | | |
|---|---|---|---|---|
| 2011/0208842 | A1* | 8/2011 | Mildh | H04B 7/155 709/220 |
| 2011/0244851 | A1* | 10/2011 | Gunnarsson et al. | 455/423 |
| 2012/0071085 | A1* | 3/2012 | Gunnarsson et al. | 455/7 |
| 2012/0120831 | A1* | 5/2012 | Gonsa | H04W 76/025 370/252 |
| 2012/0147830 | A1* | 6/2012 | Lohr | H04W 72/042 370/329 |
| 2012/0182929 | A1* | 7/2012 | Chen | H04L 63/1458 370/315 |
| 2012/0195226 | A1* | 8/2012 | Liu | H04L 1/0026 370/252 |
| 2012/0236782 | A1* | 9/2012 | Bucknell et al. | 370/315 |
| 2013/0039185 | A1* | 2/2013 | Teyeb et al. | 370/235 |
| 2013/0044639 | A1* | 2/2013 | Wang | H04B 7/155 370/254 |
| 2013/0208649 | A1* | 8/2013 | Waldhauser et al. | 370/315 |

OTHER PUBLICATIONS

3GPP TSG RAN WG3 Meeting #68, Montreal, Canada, May 10-14, 2010, R3-101620, "Neighbour Discovery and Neighbour Management with Relays", Mitsubishi Electric, 5 pgs.

3GPP TSG-RAN WG3 #69bis, Oct. 11-15, 2010, Xi'an, China, R3-102610, "Discussion on Handling of Neighbour Relation in Relays", Fujitsu, 4 pgs.

3GPP TSG-RAN3 Meeting #69bis, Xi'an, China, Oct. 11-15, 2010, Draft R3-102690,"LTE_Relay-Core", CATT, 5 pgs.

3GPP TSG RAN WG3 Meeting #69bis, Xian, China, Oct. 11-15, 2010, R3-102853, "Neighbour Discovery by a Relay Node", Mitsubishi Electric, 5 pgs.

3GPP TR 36.806 V9.0.0 (Mar. 2010), "3$^{rd}$ Generation Partnership Project; Technical Specification Group Radio Access Network; Evolved Universal Terrestrial Radio Access (E-UTRA); Relay architectures for E-UTRA (LTE-Advanced) (Release 9)", 34 pgs.

3GPP TS 36.423 V9.4.0 (Sep. 2010), 3$^{rd}$ Generation Partnership Project; Technical Specification Group Radio Access Network; Evolved Universal Terrestrial Radio Access (E-UTRA); X2 application protocol (X2AP) (Release 9), 121 pgs.

"3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP TS 36.300 V10.1.0, Sep. 2010, 192 pgs.

"Challenges of X2 deployment for Relay nodes", Nokia Siemens Networks, 3GPP TSG-RAN WG3 Meeting RAN3 ad Hoc, R3-101953, Jun. 29-Jul. 1, 2010, 4 pgs.

* cited by examiner

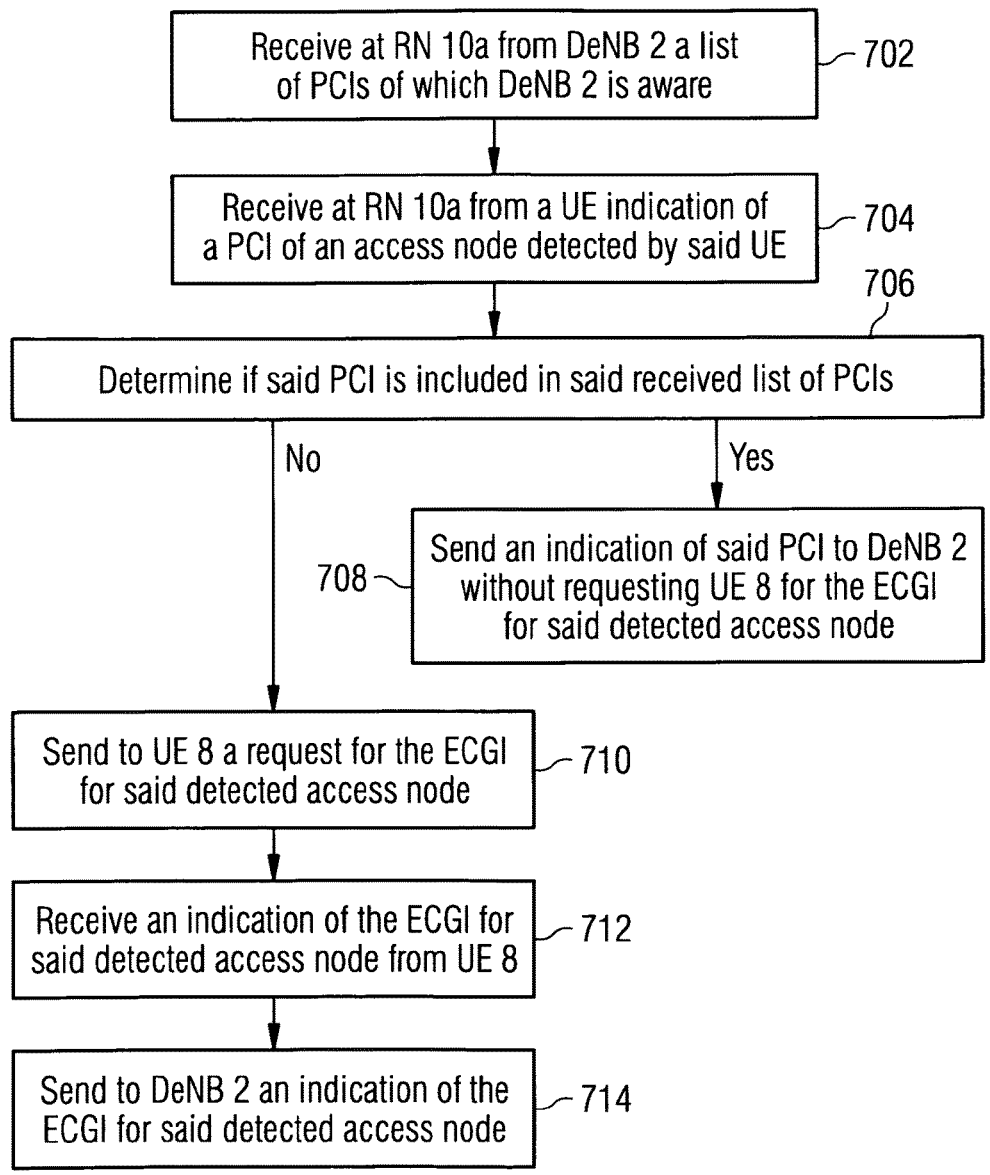

RELAY NODES

FIELD OF THE INVENTION

The present invention relates to the distribution of configuration information in a communication system including a cellular radio access network employing relay nodes.

BACKGROUND

A communication device can be understood as a device provided with appropriate communication and control capabilities for enabling use thereof for communication with others parties. The communication may comprise, for example, communication of voice, electronic mail (email), text messages, data, multimedia and so on. A communication device typically enables a user of the device to receive and transmit communication via a communication system and can thus be used for accessing various service applications.

A communication system is a facility which facilitates the communication between two or more entities such as the communication devices, network entities and other nodes. A communication system may be provided by one or more interconnect networks. One or more gateway nodes may be provided for interconnecting various networks of the system. For example, a gateway node is typically provided between an access network and other communication networks, for example a core network and/or a data network.

An appropriate access system allows the communication device to access to the wider communication system. An access to the wider communications system may be provided by means of a fixed line or wireless communication interface, or a combination of these. Communication systems providing wireless access typically enable at least some mobility for the users thereof. Examples of these include wireless communications systems where the access is provided by means of an arrangement of cellular access networks. Other examples of wireless access technologies include different wireless local area networks (WLANs) and satellite based communication systems.

A wireless access system typically operates in accordance with a wireless standard and/or with a set of specifications which set out what the various elements of the system are permitted to do and how that should be achieved. For example, the standard or specification may define if the user, or more precisely user equipment, is provided with a circuit switched bearer or a packet switched bearer, or both. Communication protocols and/or parameters which should be used for the connection are also typically defined. For example, the manner in which communication should be implemented between the user equipment and the elements of the networks and their functions and responsibilities are typically defined by a predefined communication protocol. Such protocols and or parameters further define the frequency spectrum to be used by which part of the communications system, the transmission power to be used etc.

In the cellular systems a network entity in the form of a base station provides a node for communication with mobile devices in one or more cells or sectors. It is noted that in certain systems a base station is called 'Node B (NB)' or "eNode B (eNB)". Typically the operation of a base station apparatus and other apparatus of an access system required for the communication is controlled by a centralised control entity (which centralised control entity is typically interconnected with other centralised control entities of the particular communication network), or every base station (e.g. eNodeB) contains its own local control entity. Examples of cellular access systems include, in order of their evolution, GSM (Global System for Mobile) EDGE (Enhanced Data for GSM Evolution) Radio Access Networks (GERAN), Universal Terrestrial Radio Access Networks (UTRAN) and evolved UTRAN (E-UTRAN).

Relay nodes are intermediate access nodes via which a user equipment can access a main access node. Some aims of relay nodes in cellular radio access networks include: extending coverage of the radio access network; providing high-bit-rate coverage in high shadowing environments; reducing average radio-transmission power and thereby better conserving battery power at user equipments; enhancing cell capacity and effective throughput by, for example, increasing cell-edge capacity and balancing cell load; and enhancing the overall performance and deployment cost of the radio access network.

The cellular radio access network includes a network of main access nodes to which a user equipment in the right environment/location can establish a direct wireless connection. User equipments at disadvantaged positions such as cell edges and high shadowing areas can have access to a main access node via the combination of a wireless connection between the user equipment and a relay node and a wireless connection between the relay node and the main access node.

One feature of one proposed system is that any access node of the cellular radio access network (including relay nodes) should have configuration information about neighbouring access nodes. In particular, each access node should have the necessary configuration information to establish a link with a neighbouring access node other than via the core network associated with the access nodes of the radio access network, in preparation for a possible handover of a user equipment from one access node to a neighbouring access node. There has been identified the challenge of distributing such configuration information relating to relay nodes in an efficient manner.

It is an aim to meet this challenge.

SUMMARY

There is provided a method, comprising: receiving at a donor access node from a relay node associated with the donor access node via a wireless interface an identification of one or more other access nodes detected at the relay node; and sending configuration information about said relay node from said donor access node to at least one of said one or more other access nodes in advance of an indication that a user equipment associated with the relay node has detected said at least one other access node, without at the same time sending said configuration information to at least one further access node that is detected by one or more other relay nodes or user equipments associated with the donor access node but not detected by said relay node; wherein said configuration information comprises information for setting up a communication via an interface with the relay node other than via a core network associated with the donor access node.

The identification of one or more other access nodes detected at the relay node may comprise an identification of one or more other access nodes from which synchronisation signals are detected at said relay node.

The configuration information may comprise a second identifier for the relay node.

The identification of one or more other access nodes detected at the relay node may be received at the donor access node as part of a procedure to attach the relay node to the donor access node.

According to a second aspect there is provided a method, comprising: receiving at a donor access node from a relay node associated with the donor access node via a wireless interface an identification of one or more other access nodes detected at the relay node; sending from said donor access node to said relay node configuration information about at least one of said one or more other access nodes in advance of an indication that a user equipment associated with the relay node has detected said at least one other access node, without at the same time sending to said relay node configuration information about at least one further access node that is detected by other relay nodes or user equipment associated with the donor access node but not detected by said relay node; wherein said configuration information comprises information for setting up a communication via an interface with said at least one of said one or more other access nodes other than via a core network associated with the donor access node.

The identification of one or more other access nodes detected at the relay node may comprise an identification of one or more other access nodes from which synchronisation signals are detected at said relay node.

The configuration information may comprise a second identifier for the relay node.

The identification of one or more other access nodes detected at the relay node may be received at the donor access node as part of a procedure to attach the relay node to the donor access node.

According to a third aspect there is provided a method, comprising: detecting at an access node previously detected by a user equipment or relay node associated with a donor access node a relay node associated with said donor access node; sending from said access node to said donor access node a request for configuration information about the relay node; and receiving from said donor access node configuration information about the relay node; wherein said configuration information comprises information for setting up a communication via an interface with the relay node other than via a core network associated with the donor access node.

The configuration information may comprise a second identifier for the relay node.

The access node may not be detected by said relay node associated with said donor access node at the time of attachment of said relay node to said donor access node.

According to a fourth aspect there is provided a method, comprising: receiving at a donor access node from an access node previously detected by a user equipment or relay node associated with the donor access node a request for configuration information about a relay node associated with said donor access node; and sending from said donor access node to said access node configuration information about the relay node; wherein said configuration information comprises information for setting up a communication via an interface with the relay node other than via a core network associated with the donor access node.

The configuration information may comprise a second identifier for the relay node.

The access node may not be detected by said relay node associated with said donor access node at the time of attachment of said relay node to said donor access node.

According to a fifth aspect there is provided a method, comprising: determining at a relay node whether a donor access node associated with said relay node recognises a first kind of identifier for a further access node detected by the relay node; and acquiring information about a second kind of identifier for said further access node only if it is determined that the donor access node does not recognise said first kind of identifier for said further access node.

The determining may comprise determining if said donor access node has previously indicated a recognition of said first kind of identifier for the further access node.

The determining may comprise: sending said first kind of identifier to the donor access node.

The method may further comprise: acquiring said information about said second kind of identifier for said further access node only if said relay node receives an indication that said donor access node does not recognise said first kind of identifier.

The first kind of identifier may be a physical cell ID.

The second kind of identifier may be a E-UTRAN Global Cell ID.

According to a sixth aspect there is provided an apparatus comprising: a processor and memory including computer program code, wherein the memory and computer program code are configured to, with the processor, cause the apparatus to: receive at a donor access node from a relay node associated with the donor access node via a wireless interface an identification of one or more other access nodes detected at the relay node; and send configuration information about said relay node from said donor access node to at least one of said one or more other access nodes in advance of an indication that a user equipment associated with the relay node has detected said at least one other access node, without at the same time sending said configuration information to at least one further access node that is detected by one or more other relay nodes or user equipments associated with the donor access node but not detected by said relay node; wherein said configuration information comprises information for setting up a communication via an interface with the relay node other than via a core network associated with the donor access node.

The identification of one or more other access nodes detected at the relay node may comprise an identification of one or more other access nodes from which synchronisation signals are detected at said relay node.

The configuration information may comprise a second identifier for the relay node.

The identification of one or more other access nodes detected at the relay node may be received at the donor access node as part of a procedure to attach the relay node to the donor access node.

An apparatus as described herein may comprise one of: a base station and an eNodeB.

According to a seventh aspect there is provided an apparatus comprising: a processor and memory including computer program code, wherein the memory and computer program code are configured to, with the processor, cause the apparatus to: receive at a donor access node from a relay node associated with the donor access node via a wireless interface an identification of one or more other access nodes detected at the relay node; and send from said donor access node to said relay node configuration information about at least one of said one or more other access nodes in advance of an indication that a user equipment associated with the relay node has detected said at least one other access node, without at the same time sending to said relay node configuration information about at least one further access node that is detected by other relay nodes or user equipment associated with the donor access node but not detected by said relay node; wherein said configuration information comprises information for setting up a communication via an interface with said at least one of said one or more other access nodes other than via a core network associated with the donor access node.

The identification of one or more other access nodes detected at the relay node may comprise an identification of other access nodes from which synchronisation signals are detected at said relay node.

The configuration information may comprise a second identifier for the relay node.

The identification of one or more other access nodes detected at the relay node may be received at the donor access node as part of a procedure to attach the relay node to the donor access node.

The apparatus as described herein may comprise one of: a base station and an eNodeB.

According to an eighth aspect there is provided an apparatus comprising: a processor and memory including computer program code, wherein the memory and computer program code are configured to, with the processor, cause the apparatus to: detect at an access node previously detected by a user equipment or relay node associated with a donor access node a relay node associated with said donor access node; send from said access node to said donor access node a request for configuration information about the relay node; and receive from said donor access node configuration information about the relay node; wherein said configuration information comprises information for setting up a communication via an interface with the relay node other than via a core network associated with the donor access node.

The configuration information may comprise a second identifier for the relay node.

The access node may not be detected by said relay node associated with said donor access node at the time of attachment of said relay node to said donor access node.

The apparatus as described herein may comprise one of: a base station and an eNodeB.

According to a ninth aspect there is provided an apparatus comprising: a processor and memory including computer program code, wherein the memory and computer program code are configured to, with the processor, cause the apparatus to: receive at a donor access node from an access node previously detected by a user equipment or relay node associated with the donor access node a request for configuration information about a relay node associated with said donor access node; and send from said donor access node to said access node configuration information about the relay node; wherein said configuration information comprises information for setting up a communication via an interface with the relay node other than via a core network associated with the donor access node.

The configuration information may comprise a second identifier for the relay node.

The access node may not be detected by said relay node associated with said donor access node at the time of attachment of said relay node to said donor access node.

An apparatus as described herein may comprise one of: a base station and an eNodeB.

According to a tenth aspect there is provided an apparatus comprising: a processor and memory including computer program code, wherein the memory and computer program code are configured to, with the processor, cause the apparatus to: determine at a relay node whether a donor access node associated with said relay node recognises a first kind of identifier for a further access node detected by the relay node; and acquire information about a second kind of identifier for said further access node only if it is determined that the relay node does not recognise said first kind of identifier for said further access node.

The memory and computer program code may be configured to, with the processor, cause the apparatus to determine if said donor access node has previously indicated a recognition of said first kind of identifier for the further access node.

The memory and computer program code may be configured to, with the processor, cause the apparatus to send said first kind of identifier to the donor access node.

The memory and computer program code may be configured to, with the processor, cause the apparatus to acquire said information about said second kind of identifier for said further access node only if said relay node receives an indication that said donor access node does not recognise said first kind of identifier.

The first kind of identifier may be a physical cell ID.

The second kind of identifier may be a E-UTRAN Global Cell ID.

An apparatus as described herein may comprise a fixed or mobile relay node.

According to an eleventh aspect there is provided an apparatus configured to: receive at a donor access node from a relay node associated with the donor access node via a wireless interface an identification of one or more other access nodes detected at the relay node; and send configuration information about said relay node from said donor access node to at least one of said one or more other access nodes in advance of an indication that a user equipment associated with the relay node has detected said at least one other access node, without at the same time sending said configuration information to at least one further access node that is detected by one or more other relay nodes or user equipments associated with the donor access node but not detected by said relay node; wherein said configuration information comprises information for setting up a communication via an interface with the relay node other than via a core network associated with the donor access node.

According to a twelfth aspect there is provided an apparatus configured to: receive at a donor access node from a relay node associated with the donor access node via a wireless interface an identification of one or more other access nodes detected at the relay node; and send from said donor access node to said relay node configuration information about at least one of said one or more other access nodes in advance of an indication that a user equipment associated with the relay node has detected said at least one other access node, without at the same time sending to said relay node configuration information about at least one further access node that is detected by other relay nodes or user equipment associated with the donor access node but not detected by said relay node; wherein said configuration information comprises information for setting up a communication via an interface with said at least one of said one or more other access nodes other than via a core network associated with the donor access node.

According to a thirteenth aspect there is provided an apparatus configured to: detect at an access node previously detected by a user equipment or relay node associated with a donor access node a relay node associated with said donor access node; send from said access node to said donor access node a request for configuration information about the relay node; and receive from said donor access node configuration information about the relay node; wherein said configuration information comprises information for setting up a communication via an interface with the relay node other than via a core network associated with the donor access node.

According to a fourteenth aspect there is provided an apparatus configured to: receive at a donor access node from an access node previously detected by a user equipment or relay node associated with the donor access node a request for configuration information about a relay node associated with said donor access node; and send from said donor access node to said access node configuration information about the relay node; wherein said configuration information comprises information for setting up a communication via an interface with the relay node other than via a core network associated with the donor access node.

An apparatus as described herein may comprise one of: a base station and an eNodeB.

According to a fifteenth aspect there is provided an apparatus configured to: determine at a relay node whether a donor access node associated with said relay node recognises a first kind of identifier for a further access node detected by the relay node; and acquire information about a second kind of identifier for said further access node only if it is determined that the relay node does not recognise said first kind of identifier for said further access node.

An apparatus as described herein may comprise one of: a base station and an eNodeB.

An apparatus may be configured to carry out the method as described herein.

According to a sixteenth aspect there is provided a computer program product comprising program code means which when loaded into a computer controls the computer to: receive at a donor access node from a relay node associated with the donor access node via a wireless interface an identification of one or more other access nodes detected at the relay node; and send configuration information about said relay node from said donor access node to at least one of said one or more other access nodes in advance of an indication that a user equipment associated with the relay node has detected said at least one other access node, without at the same time sending said configuration information to at least one further access node that is detected by one or more other relay nodes or user equipments associated with the donor access node but not detected by said relay node; wherein said configuration information comprises information for setting up a communication via an interface with the relay node other than via a core network associated with the donor access node.

According to a seventeenth aspect there is provided a computer program product comprising program code means which when loaded into a computer controls the computer to: receive at a donor access node from a relay node associated with the donor access node via a wireless interface an identification of one or more other access nodes detected at the relay node; and send from said donor access node to said relay node configuration information about at least one of said one or more other access nodes in advance of an indication that a user equipment associated with the relay node has detected said at least one other access node, without at the same time sending to said relay node configuration information about at least one further access node that is detected by other relay nodes or user equipment associated with the donor access node but not detected by said relay node; wherein said configuration information comprises information for setting up a communication via an interface with said at least one of said one or more other access nodes other than via a core network associated with the donor access node.

According to an eighteenth aspect there is provided a computer program product comprising program code means which when loaded into a computer controls the computer to: detect at an access node previously detected by a user equipment or relay node associated with a donor access node a relay node associated with said donor access node; send from said access node to said donor access node a request for configuration information about the relay node; and receive from said donor access node configuration information about the relay node; wherein said configuration information comprises information for setting up a communication via an interface with the relay node other than via a core network associated with the donor access node.

According to a nineteenth aspect there is provided a computer program product comprising program code means which when loaded into a computer controls the computer to: receive at a donor access node from an access node previously detected by a user equipment or relay node associated with the donor access node a request for configuration information about a relay node associated with said donor access node; and send from said donor access node to said access node configuration information about the relay node; wherein said configuration information comprises information for setting up a communication via an interface with the relay node other than via a core network associated with the donor access node.

According to a twentieth aspect there is provided a computer program product comprising program code means which when loaded into a computer controls the computer to: determine at a relay node whether a donor access node associated with said relay node recognises a first kind of identifier for a further access node detected by the relay node; and acquire information about a second kind of identifier for said further access node only if it is determined that the relay node does not recognise said first kind of identifier for said further access node.

According to a twenty first aspect there is provided an apparatus comprising: means for receiving at a donor access node from a relay node associated with the donor access node via a wireless interface an identification of one or more other access nodes detected at the relay node; and means for sending configuration information about said relay node from said donor access node to at least one of said one or more other access nodes in advance of an indication that a user equipment associated with the relay node has detected said at least one other access node, without at the same time sending said configuration information to at least one further access node that is detected by one or more other relay nodes or user equipments associated with the donor access node but not detected by said relay node; wherein said configuration information comprises information for setting up a communication via an interface with the relay node other than via a core network associated with the donor access node.

According to a twenty second aspect there is provided an apparatus comprising: means for receiving at a donor access node from a relay node associated with the donor access node via a wireless interface an identification of one or more other access nodes detected at the relay node; and means for sending from said donor access node to said relay node configuration information about at least one of said one or more other access nodes in advance of an indication that a user equipment associated with the relay node has detected said at least one other access node, without at the same time sending to said relay node configuration information about at least one further access node that is detected by other relay nodes or user equipment associated with the donor access node but not detected by said relay node; wherein said configuration information comprises information for setting up a communication via an interface with said at least one of said one or more other access nodes other than via a core network associated with the donor access node.

According to a twenty third aspect there is provided an apparatus comprising: means for detecting at an access node previously detected by a user equipment or relay node associated with a donor access node a relay node associated with said donor access node; means for sending from said access node to said donor access node a request for configuration information about the relay node; and receive from said donor access node configuration information about the relay node; wherein said configuration information comprises information for setting up a communication via an interface with the relay node other than via a core network associated with the donor access node.

According to a twenty fourth aspect there is provided an apparatus comprising: means for receiving at a donor access node from an access node previously detected by a user equipment or relay node associated with the donor access node a request for configuration information about a relay node associated with said donor access node; and means for sending from said donor access node to said access node configuration information about the relay node; wherein said configuration information comprises information for setting up a communication via an interface with the relay node other than via a core network associated with the donor access node.

According to a twenty fifth aspect there is provided an apparatus comprising: means for determining at a relay node whether a donor access node associated with said relay node recognises a first kind of identifier for a further access node detected by the relay node; and means for acquiring information about a second kind of identifier for said further access node only if it is determined that the relay node does not recognise said first kind of identifier for said further access node.

BRIEF DESCRIPTION OF THE DRAWINGS

FIG. 7 illustrates another example of operations carried out a relay node of FIG. 1.

DETAILED DESCRIPTION

The following description relates to the example of a communication system including a radio access network operating in accordance with Long Term Evolution (LTE) Release 8 or Release 9 or Release 10 or beyond.

Figure 1:
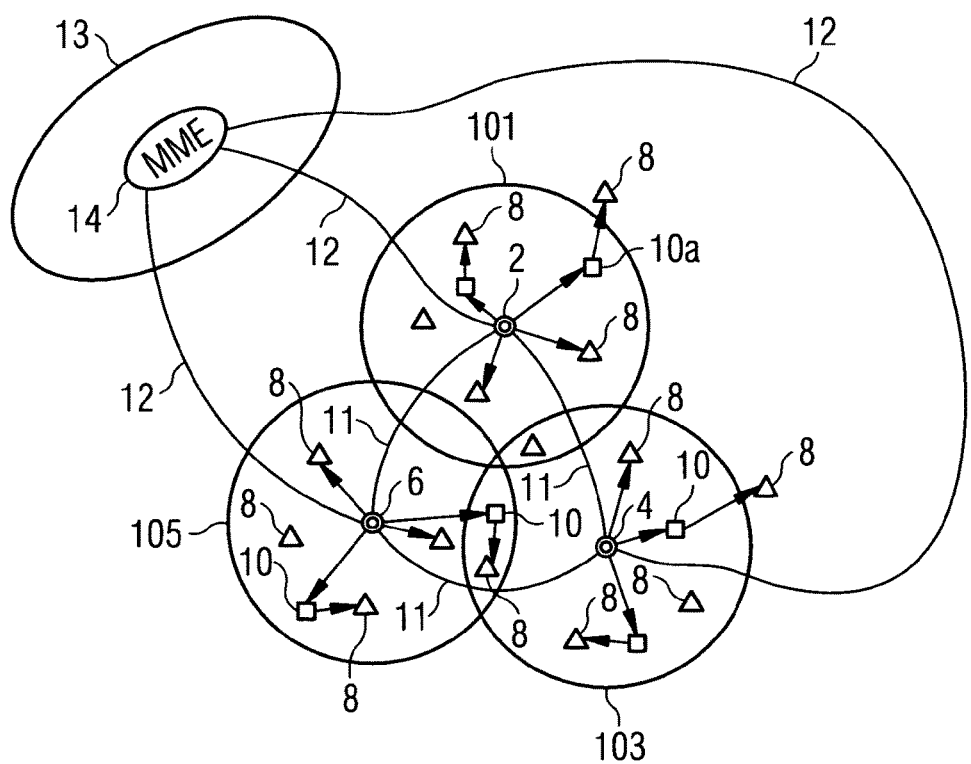
FIG. 1 illustrates an example of a communication system including a radio access network involving relay nodes.

FIG. 1 illustrates an example of a cellular E-UTRAN deploying relay nodes.

For simplicity, only three cells are shown in FIG. 1, but a large cellular radio access network can have tens of thousands of cells.

The E-UTRAN includes a network of base stations 2, 4, 6 (eNBs). The eNBs each have a direct link 12 (known as a S1 link) to a mobile management entity 14 of an evolved packet core (EPC) network 13 associated with the E-UTRAN. The eNBs 2, 4, 6 can also establish links 11 between themselves other than via the EPC network 13, which links 11 are referred to as X2 links. These X2 links 11 are used, for example, at the time of a handover of a user equipment (UE) 8 from one eNB to another. For example, when a handover is performed, data that have not already reached the UE at the source eNB can be forwarded via the X2 link to the target eNB and be delivered to the UE there. However there are also further optimizations that can be done if a link between neighboring eNBs exists e.g. Inter Cell Interference Coordination (ICIC), where cells negotiate which signals to send on which resources in order to allow a better operation of UEs at the cell border due to smartly controlling the interference that is received from the other cell.

Figure 2:
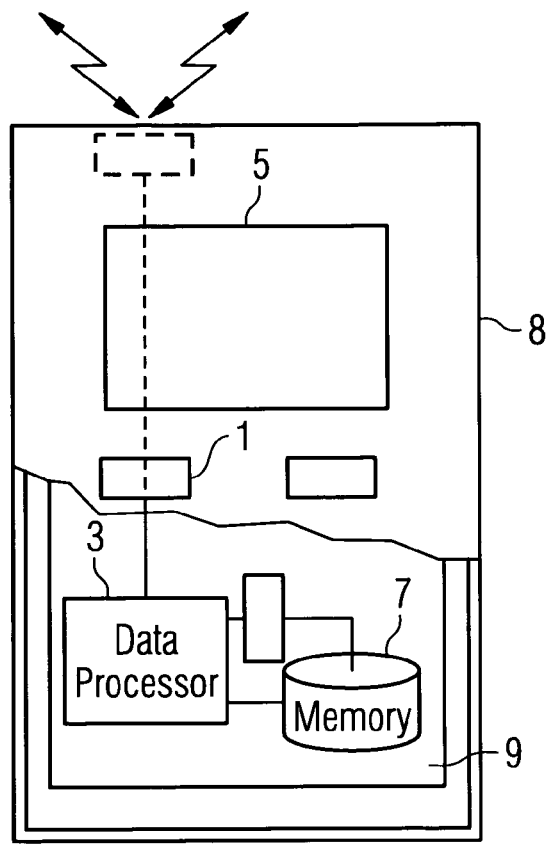
FIG. 2 illustrates some components of one example of user equipment as shown in FIG. 1.

FIG. 2 illustrates some components of one example of user equipment as shown in FIG. 1. The user equipment (UE) 8 may be used for various tasks such as making and receiving phone calls, for receiving and sending data from and to a data network and for experiencing, for example, multimedia or other content.

The UE 8 may be any device capable of at least sending or receiving radio signals. Non-limiting examples include a mobile station (MS), a portable computer provided with a wireless interface card or other wireless interface facility, personal data assistant (PDA) provided with wireless communication capabilities, or any combinations of these or the like. The UE 8 may communicate via an appropriate radio interface arrangement of the UE 8. The interface arrangement may be provided for example by means of a radio part 7 and associated antenna arrangement. The antenna arrangement may be arranged internally or externally to the UE 8.

The UE 8 may be provided with at least one data processing entity 3 and at least one memory or data storage entity 7 for use in tasks it is designed to perform. The data processor 3 and memory 7 may be provided on an appropriate circuit board 9 and/or in chipsets.

The user may control the operation of the UE 8 by means of a suitable user interface such as key pad 1, voice commands, touch sensitive screen or pad, combinations thereof or the like. A display 5, a speaker and a microphone may also be provided. Furthermore, the UE 8 may comprise appropriate connectors (either wired or wireless) to other devices and/or for connecting external accessories, for example hands-free equipment, thereto.

Figure 3:
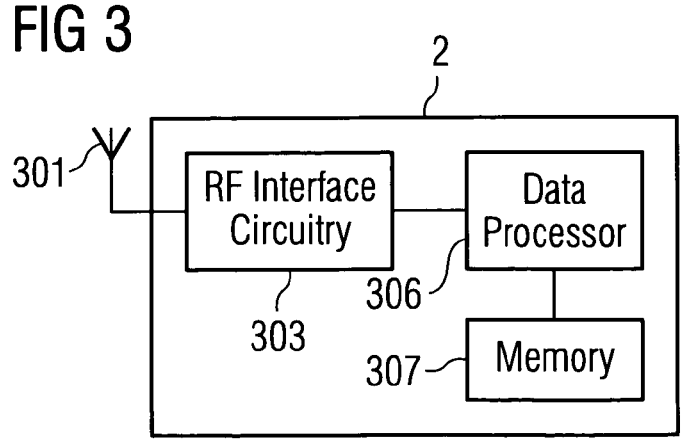
FIG. 3 illustrates some components of an example of an apparatus suitable for the access nodes shown in FIG. 1.
Figure 4:
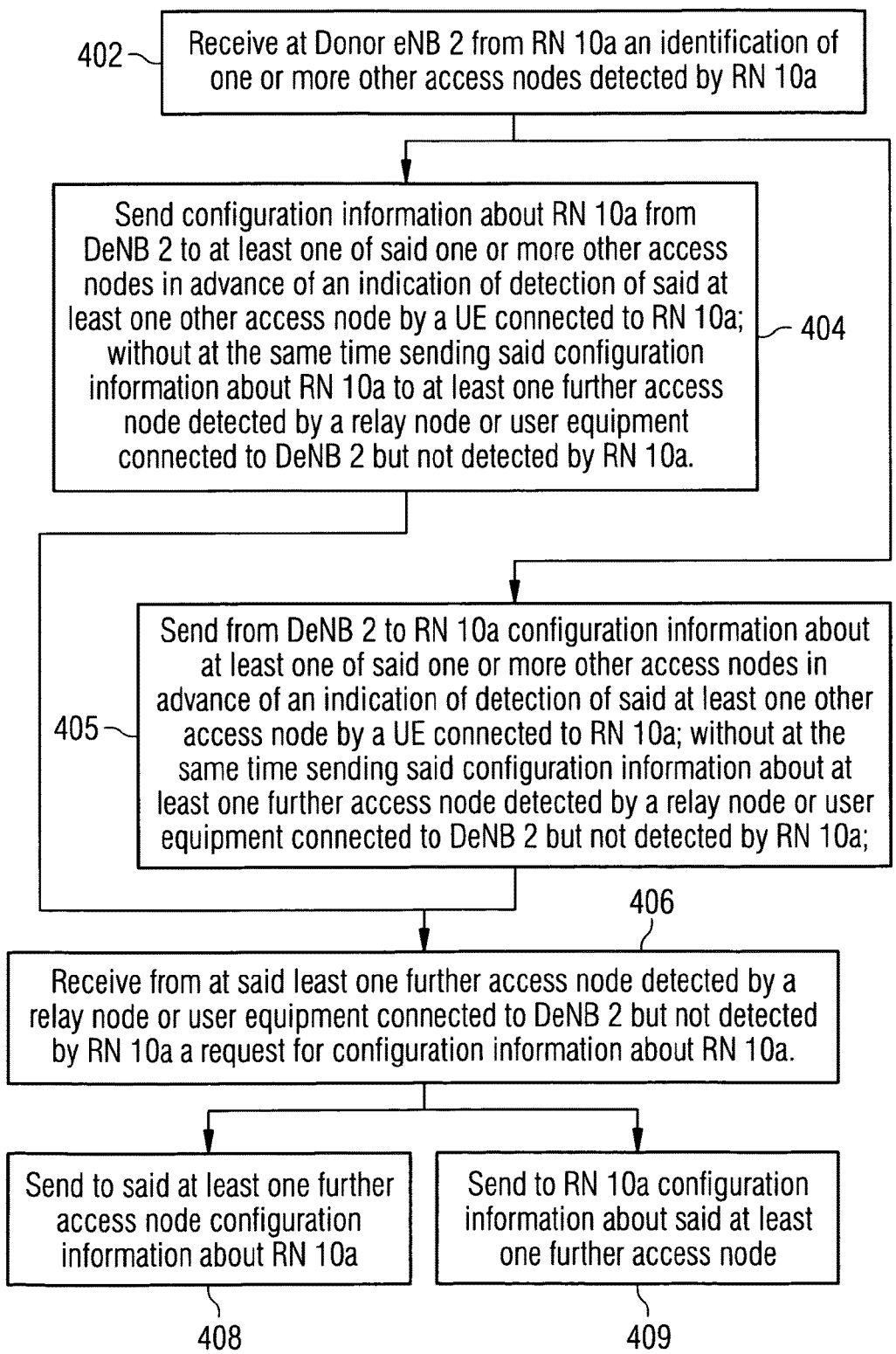
FIG. 4 illustrates one example of operations carried out at an eNB of FIG. 1.
Figure 5:
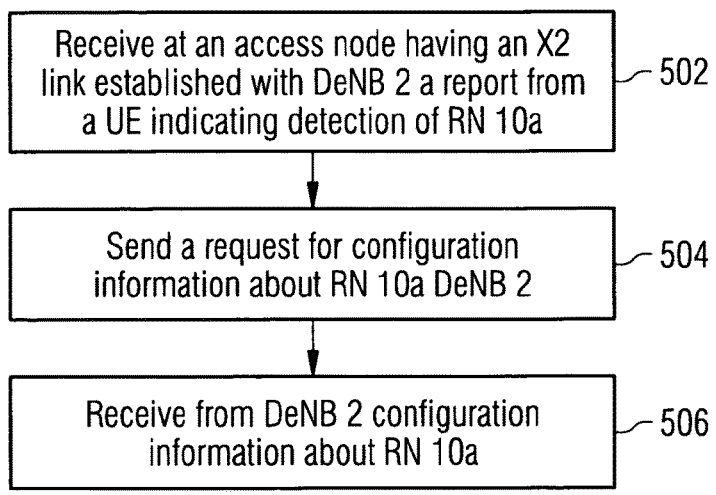
FIG. 5 illustrates one example of operations carried out at a eNB or relay node of FIG. 1.
Figure 6:
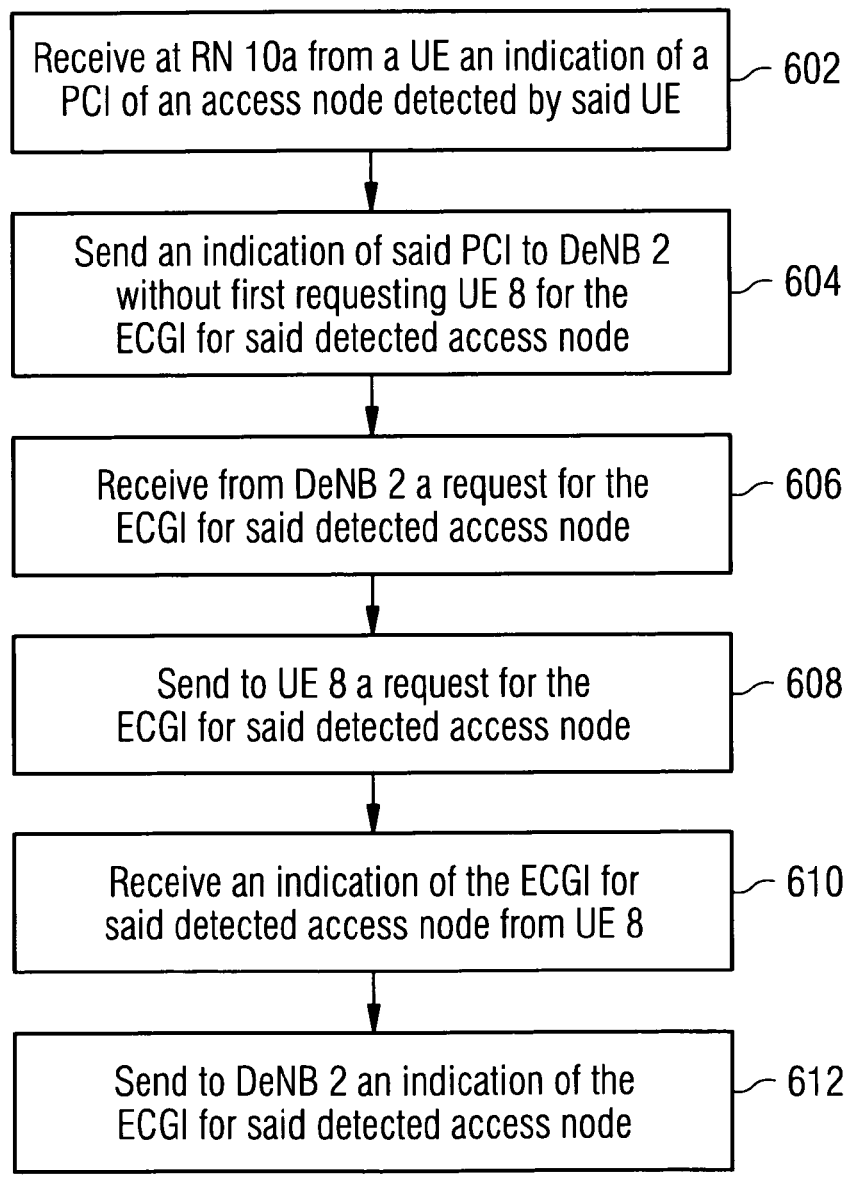
FIG. 6 illustrates one example of operations carried out at a relay node of FIG. 1.

FIG. 3 illustrates some components of an example of an apparatus suitable for the access nodes shown in FIG. 1. The apparatus 2 may comprise a radio frequency antenna 301 configured to receive and transmit radio frequency signals, radio frequency interface circuitry 303 configured to interface the radio frequency signals received and transmitted by the antenna 301. The radio frequency interface circuitry may also be known as a transceiver. The apparatus 2 may also comprise a data processor 306 configured to process signals from the radio frequency interface circuitry 303, control the radio frequency interface circuitry 303 to generate suitable RF signals. The access node may further comprise a memory 307 for storing data, parameters and instructions for use by the data processor 306.

It will be understood that both the UE 8 and access nodes shown in FIGS. 2 and 3 respectively and described above may comprise further elements which are not directly involved with the embodiments described hereafter.

UEs 8 in the right environment/location can establish a direct wireless connection with one of the eNBs 2, 4, 6. UEs 8 at relatively disadvantaged positions such as cell edges and high shadowing areas can have access to an eNB 2, 4, 6 via the combination of a wireless connection between the UE 8 and a relay node 10 (RN) and a wireless connection between the RN 10 and one the eNB 2, 4, 6. In this case, the eNB is referred to as a donor eNB (DeNB).

The UEs 8 cannot distinguish between eNBs 2, 4, 6 and RNs 10. The RNs 10 have the same Release 8 eNB cell parameters as the eNBs 2, 4, 6 and broadcast them so that they are recognized as a normal eNB by the UEs. A DeNB acts like a proxy for both S1 and X2 signalling to and from the RN 10, thereby effectively hiding the RN 10 from the EPC 13. In other words, from the point of view of the EPC 13, the relayed UEs 8 are connected directly to the DeNB, and the RN 10 appears like an ordinary cell, sometimes called sector, within the DeNB.

The first phase of the procedure for attaching RN 10a to eNB 2 involves RN 10a attaching to the network in a similar way as a normal UE 8 would do and then receiving initial configuration parameters from RN Operations and Maintenance (OAM), and also the list of DeNBs the RN 10a is allowed to connect to. During this phase it is not necessary that the selected eNB 2 is also a DeNB. After that RN 10a detaches from E-UTRAN in the same way as a UE 8 would do. Let's assume that DeNB 2 is in the list of allowed DeNBs for RN 10a. In a second phase of the attach procedure, the RN 10a connects to DeNB 2 to start relay operations, and sets up a wireless X2 link with DeNB 2.

In the above-mentioned first phase, the RN 10a detects synchronization signals from neighboring eNBs and/or other RNs, and sends measurement reports to DeNB 2 in the above-mentioned second phase (STEP 402). These measurement reports include physical cell identifiers (PCI) that the RN 10a has identified from the above-mentioned synchronization signals that it has detected. These measurements can be reported to the DeNB 2 when the RN 10a is attach to DeNB 2 but it has not yet started the relay operations, during this period the RN 10a can also detect synchronization signals from neighboring eNBs/RNs not founded during the first phase and send also these measurement reports to DeNB 2. Upon receiving the measurement reports, DeNB 2 stores the PCIs indicated in those measurement reports.

Then, on behalf of RN 10a, DeNB 2 begins the procedures for establishing X2 links between RN 10a and the eNBs/RNs identified by PCIs in the measurement reports received from RN 10a. With the aim of reducing redundant signalling, DeNB 2 does not at this time attempt to establish X2 links between RN 10a and any eNB/RN that has been detected by any UE 8 or other RN 10 associated with DeNB 2 (and for which DeNB 2 has already set up a X2 link), but only does so for those eNBs/RNs identified in the measurement reports received from RN 10a. This is considered to be particularly efficient where RN 10a is relatively remote from DeNB 2 and/or is a moving RN, because it is then even more improbable that there will be any handover of an UE 8 from RN 10a to an eNB/RN that was not detected by RN 10a but for which there is already an X2 link set up with DeNB 2.

For each eNB/RN identified in the measurement reports received from RN 10a and with which DeNB 2 has already set up an X2 link, after the RN 10a has started the relay operations and the X2 interface between RN 10a and DeNB 2 is set up, DeNB 2 notifies RN 10a of the availability of an X2 link by sending an X2AP eNB Configuration Update message that includes the configuration information (e.g. Physical Cell Identifier (PCI), E-UTRAN Cell Global Identifier (ECGI) and Evolved Absolute Radio Frequency Channel Number (EARFCN)) of said eNB/RNs (STEP 404); and DeNB 2 also sends to each of said eNB/RNs an X2AP eNB Configuration Update message that includes the configuration information (e.g. PCI, ECGI and EARFCN) for RN 10a (STEP 405). To send the configuration information to RN 10a the DeNB 2 can also include them, during the X2 setup between RN 10a and DeNB 2, in the X2 Setup Response message in response to the X2 Setup Request message received from RN 10a or in the X2 Setup Request message if the X2 setup is initiated by the DeNB 2.

The PCI is an identifier that can be reused in the network i.e. it is not unique and therefore ambiguous. The ECGI is an unique identifier, therefore the RN 10a needs to know the ECGI of the neighbor eNB/RN in order to communicate with it via X2.

It may be that DeNB 2 recognizes all the PCIs identified in the measurement reports received from RN 10a and has already established X2 links with each of those eNBs/RNs, but if there happen to be any PCIs that DeNB 2 does not recognize, then one option is to follow the procedures discussed directly below.

DeNB 2 asks RN 10a to decode the E-UTRAN Global Cell ID (EGCI) for each of the eNBs/RNs for which DeNB 2 did not recognize the PCI. The ECGI can be decoded from the broadcast channel of the respective eNB/RN. This operation can be done during the above-mentioned second phase when the RN 10a has not yet started the relay operations. For this operation the DeNB 2 can send a RRC Connection Reconfirmation request message requesting the ECGI for the detected eNB/RN identified by the PCI, and the RN 10a can transmit a measurement report to DeNB 2 including the ECGI and TAI (Tracking Area Identity). The TAI is not necessarily required, but can be included as it is typically included in the measurement report. After receiving an indication of the ECGI and TAI from RN 10a, DeNB 2 performs setup of a X2 link on behalf of RN 10a. This involves: DeNB 2 sending to the MME 14 on behalf of RN 10a an S1AP eNB Configuration Transfer message including an indication of the ECGI and TAI of the target eNB/RN; DeNB 2 receiving from the MME a S1AP MME configuration transfer message including information about the X2 TNL address for the target eNB/RN; and DeNB 2 setup an X2 interface with the target eNB/RN.

Alternatively, DeNB 2 could be configured so as to not take any immediate action in respect of any PCIs that it does not recognize. If it happens that any eNBs/RNs having PCIs that were not recognized by DeNB 2 are later detected by an UE connected to RN 10a, then X2 links can be set up at that time in accordance with the process described further below.

Similarly, in respect of any eNBs/RNs that were not identified by RN 10a in its measurement reports to DeNB 2 even though there was already an X2 link established between it/them and DeNB 2, it may possibly happen that at least one of such eNB/RN will later discover that a PCI reported by a UE connected to that eNB/RN (and having detected the PCI of RN 10a) actually belongs to an eNB with which that eNB/RN has already established an X2 link (i.e. DeNB 2) (STEP 502). In such a situation, that eNB/RN sends a message to DeNB 2 seeking more information about the cell identified by the PCI (and will include e.g. its own PCI, ECGI and EARFCN) (STEP 504). Upon receiving this request (STEP 406), DeNB 2 replies (STEP 408) with an X2AP eNB configuration update message to said eNB/RN including configuration information for allowing said eNB/RN to communicate via X2 interface with RN 10a (e.g. the PCI, ECGI, EARFCN for RN 10a) (STEP 408); and also sends a X2AP configuration update message to RN 10*a* including configuration information for establishing an X2 link between RN 10*a* and the eNB/RN (e.g. including the PCI, ECGI, EARFCN for the eNB/RN) (STEPS 409 and 506).

Where it happens that an UE 8 connected to RN 10*a* later detects an eNB/RN not originally detected by RN 10*a* at the time of the above-described attach procedure (STEP 602), RN 10*a* forwards the measurement report received from that UE 8 containing the PCI to DeNB 2 (STEP 604) without first asking the UE 8 to detect the ECGI from the broadcast channel of the detected eNB/RN. Upon receiving such a measurement report from RN 10*a*, DeNB 2 checks whether it can match the PCI with an eNB/RN with which it has already established an X2 link. If it can, DeNB 2 immediately responds to RN 10*a* with a X2AP eNB configuration update message including at least the PCI, ECGI and EARFCN for the detected eNB/RN identified by the PCI, and also sends an X2AP eNB configuration update message to the detected eNB/RN identified by the PCI including at least the PCI, ECGI and EARFCN for RN 10*a*. On the other hand, if DeNB 2 does not recognize the PCI identified in the measurement report forwarded by RN 10*a*, it responds to RN 10*a* with a RRC Connection Reconfirmation request message requesting the ECGI for the detected eNB/RN identified by the PCI (STEP 606). Upon receiving such a request, RN 10*a* sends (STEP 608) a RRC Connection Reconfirmation message to the UE 8 requesting the UE 8 to detect the ECGI and TAI from the broadcast channel of the eNB/RN identified by the PCI, and the UE 8 transmits a measurement report to RN 10*a* including the ECGI and TAI detected from the broadcast channel (STEP 610). RN 10*a* then sends (STEP 612) a S1AP eNB configuration transfer message to DeNB 2 including a SON Configuration Transfer Information Element (IE) indicating the ECGI reported by the UE 8; DeNB 2 sets up an X2 link with the eNB/RN on behalf of RN 10*a*; and DeNB 2 finishes by sending to RN 10*a* an X2AP eNB configuration transfer message including the TNL address for the eNB/RN. This message can be also skipped because the RN 10*a* does not need to know the TNL address for the eNB/RN because its X2 is setup only with the DeNB 2.

Alternatively, the DeNB 2 is configured to pre-inform RN 10*a* of all the PCIs (but not the corresponding TNL addresses because not needed at the RN 10*a*) of which it is aware (i.e. all the PCIs for which it does not require an ECGI) at the time of configuring an X2 link between RN 10*a* and DeNB 2 (STEP 702); and this list of PCIs is stored at RN 10*a*. Then when RN 10*a* receives a measurement report from a UE 8 (STEP 704), it first checks whether the PCI indicated in the measurement report from the UE 8 is included in said stored list of PCIs (STEP 706). If it is found that the PCI is not included in the list, then RN 10*a* immediately (i.e. without first sending the measurement report to DeNB 2) sends a RRC Connection Reconfirmation message to the UE 8 requesting the UE 8 to detect the ECGI and TAI from the broadcast channel of the eNB/RN identified by the PCI (STEP 710). Only after receiving back from the UE 8 a measurement report including the ECGI and TAI for the eNB/RN identified by the PCI (STEP 712), does RN 10*a* then send to DeNB 2 the above-mentioned X2AP eNB configuration transfer message (STEP 714), and this message includes the ECGI and TAI reported by the UE 8. Where it is found that the PCI is included in the list received from DeNB 2, RN 10*a* immediately sends to DeNB 2 the above-mentioned above mentioned measurement report including the PCI (STEP 708), and the DeNB proceeds as mentioned above. One advantage of this technique is that the RN 10*a* immediately knows whether a PCI is already known to be associated with an ECGI or whether it is necessary to have the ECGI be determined by the UE 8 without any communication with the DeNB 2. This both saves the associated overhead for a message exchange with the DeNB 2 and also the time needed to exchange the messages. Consequently an X2 set up can be initiated more quickly to a newly detected eNB/RN, this timing is critical at least for the first UE 8 moving towards the eNB/RN because if the X2 setup is done quickly enough the X2 link can already be utilized for the handover of the UE that has just reported the new eNB/RN.

The above-described operations may require data processing in the various entities. The data processing may be provided by means of one or more data processors. Similarly various entities described in the above embodiments may be implemented within a single or a plurality of data processing entities and/or data processors. Appropriately adapted computer program code product may be used for implementing the embodiments, when loaded to a computer. The program code product for providing the operation may be stored on and provided by means of a carrier medium such as a carrier disc, card or tape. A possibility is to download the program code product via a data network. Implementation may be provided with appropriate software in a server.

For example the embodiments may be implemented as a chipset, in other words a series of integrated circuits communicating among each other. The chipset may comprise microprocessors arranged to run code, application specific integrated circuits (ASICs), or programmable digital signal processors for performing the operations described above.

Embodiments may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the modifications explicitly mentioned above, it will be evident to a person skilled in the art that various other modifications of the described techniques may be made, and that the described techniques have application in other communication systems.

The invention claimed is:

1. A method, comprising:
   detecting at a relay node one or more access nodes, wherein detection comprises attaching to a network and detecting synchronization signals of the one or more access nodes;
   sending from the relay node to a donor access node associated with the relay node via a wireless interface an identification of the one or more access nodes detected at the relay node; and
   determining at the relay node whether the donor access node associated with said relay node recognises a first kind of identifier for a further access node detected by the relay node; and acquiring information about a second kind of identifier for said further access node only if it is determined that the donor access node does not recognise said first kind of identifier for said further access node.

2. The method of claim 1, wherein said determining comprises determining if said donor access node has previously indicated a recognition of said first kind of identifier for the further access node.

3. The method of claim 1, wherein said determining comprises: sending said first kind of identifier to the donor access node.

4. The method of claim 1, comprising: acquiring said information about said second kind of identifier for said further access node only if said relay node receives an indication that said donor access node does not recognise said first kind of identifier.

5. The method of claim 1, wherein said first kind of identifier is a physical cell ID.

6. The method of claim 1, wherein said second kind of identifier is a E-UTRAN Global Cell ID.

7. An apparatus comprising: a processor and memory including computer program code, wherein the memory and computer program code are configured to, with the processor, cause the apparatus to:
detect at a relay node one or more access nodes, wherein detection comprises attaching to a network and detecting synchronization signals of the one or more access nodes;
send from the relay node to a donor access node associated with the relay node via a wireless interface an identification of the one or more access nodes detected at the relay node; and
determine at the relay node whether the donor access node associated with said relay node recognises a first kind of identifier for a further access node detected by the relay node; and acquiring information about a second kind of identifier for said further access node only if it is determined that the donor access node does not recognise said first kind of identifier for said further access node.

8. The apparatus of claim 7, wherein, when determining, the memory and computer program code are configured to, with the processor, cause the apparatus to:
determine if said donor access node has previously indicated a recognition of said first kind of identifier for the further access node.

9. The apparatus of claim 7, wherein, when determining, the memory and computer program code are configured to, with the processor, cause the apparatus to:
send said first kind of identifier to the donor access node.

10. The apparatus of claim 7, wherein the memory and computer program code are configured to, with the processor, cause the apparatus to:
acquire said information about said second kind of identifier for said further access node only if said relay node receives an indication that said donor access node does not recognise said first kind of identifier.

11. The apparatus of claim 7, wherein said first kind of identifier is a physical cell ID.

12. The apparatus of claim 7, wherein said second kind of identifier is a E-UTRAN Global Cell ID.

13. A non-transitory computer readable medium storing a program of instructions, execution of which by at least one processor configures an apparatus to at least:
detect at a relay node one or more access nodes, wherein detection comprises attaching to a network and detecting synchronization signals of the one or more access nodes;
send from the relay node to a donor access node associated with the donor access node via a wireless interface an identification of the one or more other access nodes detected at the relay node; and
determine at the relay node whether the donor access node associated with said relay node recognises a first kind of identifier for a further access node detected by the relay node; and acquiring information about a second kind of identifier for said further access node only if it is determined that the donor access node does not recognise said first kind of identifier for said further access node.

* * * * *